US009618675B2

(12) United States Patent
Kang et al.

(10) Patent No.: US 9,618,675 B2
(45) Date of Patent: Apr. 11, 2017

(54) BACKLIGHT ASSEMBLY AND DISPLAY DEVICE HAVING THE SAME

(71) Applicant: SAMSUNG DISPLAY CO., LTD., Yongin, Gyeonggi-Do (KR)

(72) Inventors: Dong Yeon Kang, Seoul (KR); Hyoung Joo Kim, Anyang-si (KR); Rae Young Kim, Hwaseong-si (KR); Min Young Song, Asan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 64 days.

(21) Appl. No.: 14/609,592

(22) Filed: Jan. 30, 2015

(65) Prior Publication Data
US 2015/0369987 A1 Dec. 24, 2015

(30) Foreign Application Priority Data

Jun. 24, 2014 (KR) .................. 10-2014-0077174

(51) Int. Cl.
*F21V 8/00* (2006.01)
(52) U.S. Cl.
CPC .......... *G02B 6/0018* (2013.01); *G02B 6/002* (2013.01); *G02B 6/0091* (2013.01)
(58) Field of Classification Search
CPC ............................ G02B 6/003; G02B 6/0083
See application file for complete search history.

(56) References Cited

U.S. PATENT DOCUMENTS

| | | | | |
|---|---|---|---|---|
| 6,454,452 B1 * | 9/2002 | Sasagawa | ............ | G02B 6/0061 349/65 |
| 6,712,481 B2 * | 3/2004 | Parker | ................... | A61M 21/02 362/330 |
| 6,851,815 B2 * | 2/2005 | Lee | ...................... | G02B 6/0036 349/61 |
| 7,206,491 B2 * | 4/2007 | Feng | .................... | G02B 6/0016 385/146 |
| 7,548,287 B2 | 6/2009 | Oh | | |
| 7,632,003 B2 * | 12/2009 | Noh | ....................... | G02B 6/003 362/337 |
| 8,070,346 B2 * | 12/2011 | Maeda | ................. | G02B 6/0068 362/620 |
| 8,308,337 B2 * | 11/2012 | Yeh | ...................... | G02B 6/0038 362/336 |

(Continued)

FOREIGN PATENT DOCUMENTS

| | | |
|---|---|---|
| KR | 1020080001753 | 1/2008 |
| KR | 1020100040101 | 4/2010 |
| KR | 1020130014224 | 2/2013 |

*Primary Examiner* — Elmito Breval
(74) *Attorney, Agent, or Firm* — F. Chau & Associates, LLC

(57) ABSTRACT

A backlight assembly is provided. The backlight assembly includes a light source, a light guide plate, a light collimation unit, and a guide groove. The light guide plate faces the light source in a first direction. The light guide plate includes a first surface on which light emitted from the light source is incident on and a second surface through which the incident light is emitted. The light collimation unit protrudes from an upper surface of the light guide plate and faces the light source. The guide groove is formed in a lower surface of the light guide plate along the first surface of the light guide plate.

18 Claims, 5 Drawing Sheets

(56) References Cited

U.S. PATENT DOCUMENTS

| | | | |
|---|---|---|---|
| 8,322,905 B2* | 12/2012 | Parker | F21V 5/00 362/23.09 |
| 2007/0070649 A1* | 3/2007 | Won | G02B 6/0036 362/620 |
| 2008/0002099 A1* | 1/2008 | Oh | G02B 6/0091 349/65 |
| 2008/0231590 A1* | 9/2008 | Choi | G02B 6/0038 345/102 |
| 2010/0309688 A1* | 12/2010 | Montgomery | G02B 6/002 362/628 |
| 2011/0205759 A1 | 8/2011 | Kurata et al. | |
| 2012/0013647 A1* | 1/2012 | Fang | G02B 6/0038 345/690 |
| 2012/0134175 A1* | 5/2012 | Kunimasa | G02B 6/0016 362/602 |
| 2012/0198462 A1 | 8/2012 | Cham et al. | |
| 2012/0287677 A1* | 11/2012 | Wheatley | G02B 6/0051 362/627 |

* cited by examiner

BACKLIGHT ASSEMBLY AND DISPLAY DEVICE HAVING THE SAME

CROSS-REFERENCE TO RELATED APPLICATION

This application claims priority under 35 U.S.C. §119 to Korean Patent Application No. 10-2014-0077174, filed on Jun. 24, 2014, in the Korean Intellectual Property Office, the disclosure of which is incorporated by reference herein in its entirety.

TECHNICAL FIELD

The present inventive concept relates to a backlight assembly, more particularly, to a display device including the same.

DISCUSSION OF THE RELATED ART

A liquid crystal display may include a display panel for displaying an image and a backlight assembly for supplying light to the display panel.

The backlight assembly may include a light source and a light guide plate that guides light emitted from the light source toward the display panel. The light guide plate is disposed adjacent to the light source using a tape to increase light incidence efficiency.

However, some of the light emitted from the light source may leak into the tape and may be scattered. This may result in loss of light incident on the light guide plate.

SUMMARY

According to an exemplary embodiment of the present inventive concept, a backlight assembly is provided. The backlight assembly includes at least one light source, a light guide plate, at least one light collimation unit, and at least one guide groove. The light guide plate faces the at least one light source in a first direction. The light guide plate includes a first surface on which light emitted from the light source is incident and a second surface through which the light incident on the first surface is emitted. The at least one light collimation unit protrudes from an upper surface of the light guide plate and faces the at least one light source. Each of the guide grooves is formed in a lower surface of the light guide plate along the first surface of the light guide plate.

The at least one light collimation unit may be disposed along the first surface of the light guide plate.

The backlight assembly may further include a tape disposed in each of the guide grooves.

An area of the tape may be smaller than an area of each of the guide grooves.

A height of each of the guide grooves may be substantially the same as a height of the tape.

The guide grooves and the at least one light source may be disposed alternatively.

The at least one light collimation unit and the at least one guide groove may be disposed alternatively.

The backlight assembly may further include a circuit board on which the at least one light source is disposed.

The tape may be disposed between the light guide plate and the circuit board.

The at least one light collimation unit may have a trapezoidal cross-section when viewed from the first surface of the light guide plate.

The at least one light collimation unit may include a first side inclined part. The first side inclined part may be formed in a second direction substantially perpendicular to the first direction. The first side inclined part may have a first angle with respect to a bottom surface of the at least one light collimation unit. The first angle may be less than or equal to a predetermined value.

The predetermined value may be 30°.

Each of the guide grooves may include second side inclined parts. Each of the second side inclined parts may have a second angle to the bottom surface of the light guide plate. The second angle may be less than or equal to a predetermined value.

The predetermined value may be 30°.

The at least one light collimation unit may have a front inclined part that becomes gradually lower in height as the front inclined part is farther from the first surface of the light guide plate in the first direction.

The front inclined part of the at least one light collimation unit may have a third angle to the bottom surface of the at least one light collimation unit. The third angle may be equal to or smaller than the first angle.

According to an exemplary embodiment of the present inventive concept, a display device is provided. The display device includes a display panel and a backlight assembly. The display panel displays an image. The backlight assembly is configured to supply light to the display panel. The backlight assembly includes at least one light source, a light guide plate, and at least one light collimation unit. The light guide plate faces the at least one light source in a first direction. The light guide plate includes a first surface on which light emitted from the at least one light source is incident and a second surface through which the light incident on the first surface is emitted. The at least one light collimation unit protrudes from an upper surface of the light guide plate. The at least one light collimation unit faces the at least one light source. The at least one light collimation unit includes a first side inclined part. The first side inclined part is formed in a second direction substantially perpendicular to the first direction. The first side inclined part forms a first angle to a bottom surface of the at least one light collimation unit. The first angle is less than or equal to 30°.

The backlight assembly may further include at least one guide groove and a tape. The at least one guide groove may be formed in a lower surface of the light guide plate along the first surface of the light guide plate. The tape may be disposed in the at least one guide groove.

The at least one guide groove and the at least one light source may be disposed alternatively, and the at least one guide groove and the at least one light collimation unit may be disposed alternatively.

The at least one guide groove may include a second side inclined part. The second side inclined part may form a second angle with respect to the lower surface of the light guide plate. The second angel may be less than or equal to 30°.

BRIEF DESCRIPTION OF THE DRAWINGS

The above and other features of the present inventive concept will become more clearly understood by describing in detailed exemplary embodiments thereof with reference to the accompanying drawings of which.

DETAILED DESCRIPTION OF THE EMBODIMENTS

Figure 1:
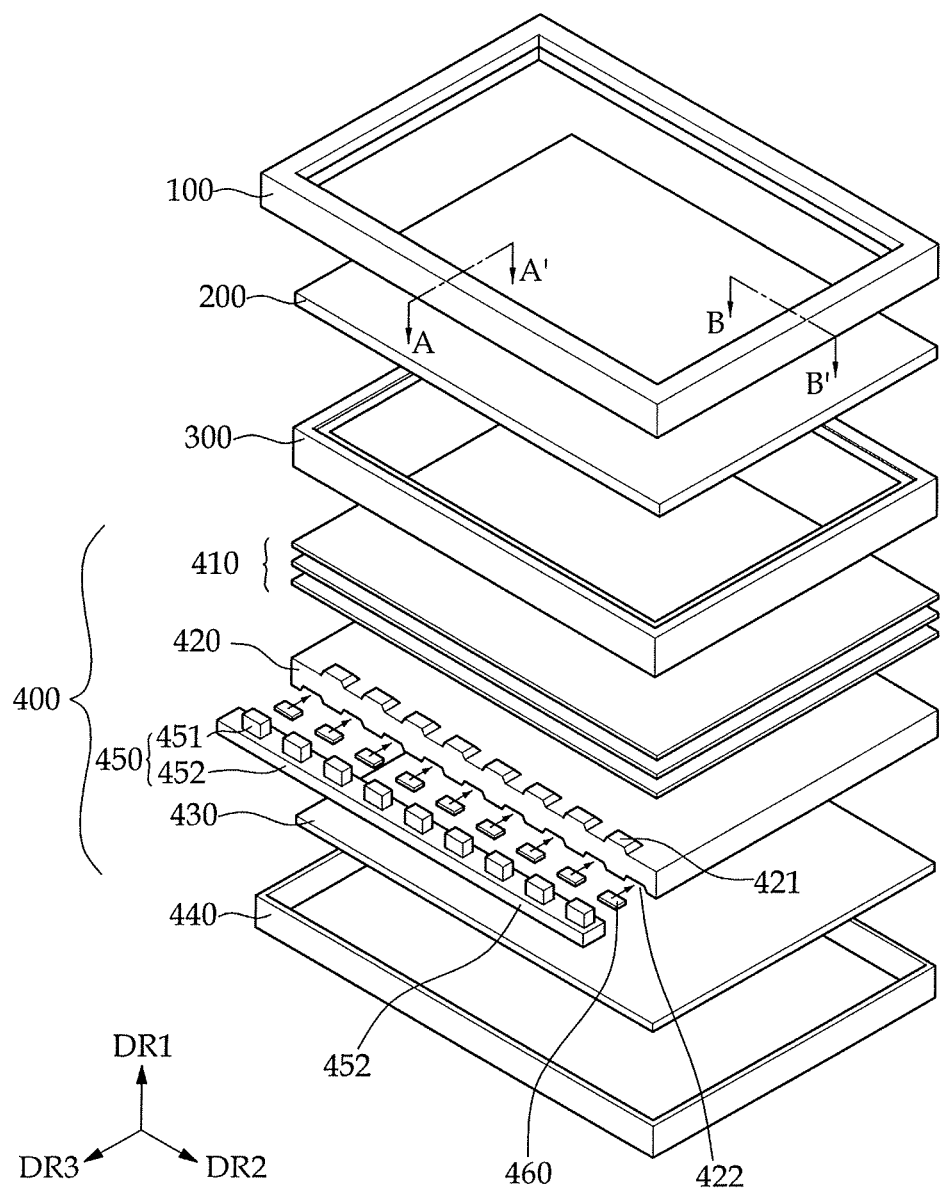
FIG. 1 is an exploded perspective view illustrating a display device according to an exemplary embodiment of the present inventive concept.

Exemplary embodiments of the present inventive concept will be described in detail with reference to the accompanying drawings. The present inventive concept may, however, be embodied in many different forms, and should not be construed as being limited to the embodiments set forth herein. Like reference numerals may refer to like elements throughout the specification. The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations. The terminology used herein is for the purpose of describing particular embodiments only and is not construed as limiting the invention. As used herein, the singular forms "a," "an" and "the" are intended to include the plural forms as well, unless the context clearly indicates otherwise.

Hereinafter, a backlight assembly and a display device according to an exemplary embodiment of the present inventive concept will be described with reference to FIGS. 1 and 2. This specification includes an exemplary embodiment of a liquid crystal display panel 200, but exemplary embodiments of the present inventive concept are not limited thereto. For example, in addition to the liquid crystal display panel 200, the present inventive concept may be applicable to any panel structure which is capable of displaying an image by receiving light from a backlight assembly 400. Meanwhile, a direction DR3 may be a first direction and a direction DR2 may be a second direction.

FIG. 1 is an exploded perspective view illustrating a display device according to an exemplary embodiment of the present inventive concept. FIG. 2 is a cross-sectional view taken along line A-A' of FIG. 1.

Figure 2:
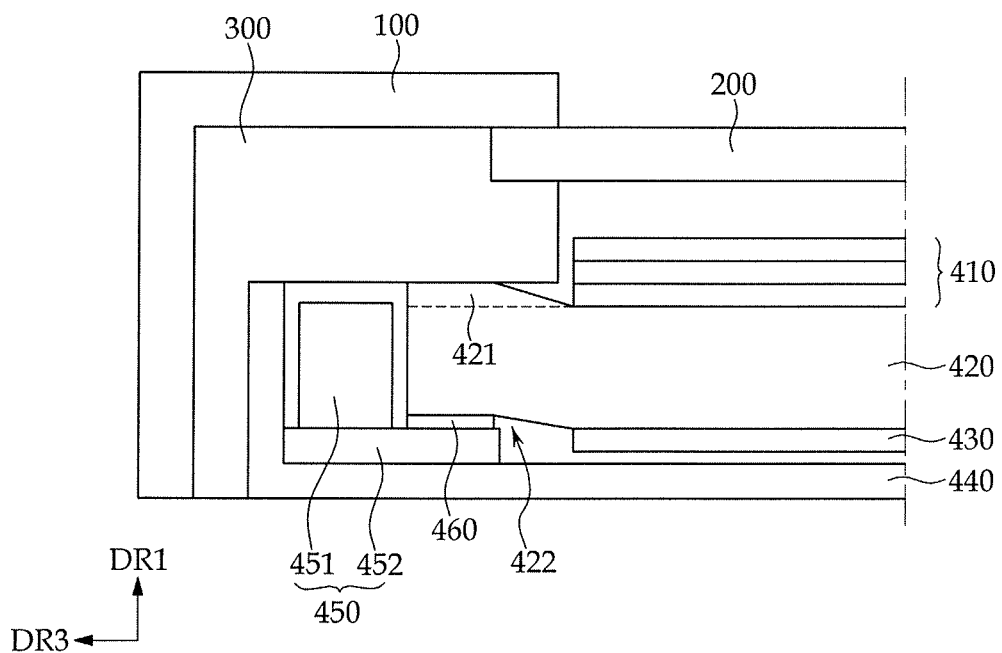
FIG. 2 is a cross-sectional view taken along line A-A' of FIG. 1 according to an exemplary embodiment of the present inventive concept.

Referring to FIGS. 1 and 2, the display device may include a display panel 200 (e.g., a liquid crystal display panel 200) configured to display an image according to an input signal, a backlight assembly 400 configured to supply light to the display panel 200, a top chassis 100 provided to cover the display panel 200, and a mold frame 300 configured to connect the top chassis 100 to a bottom chassis 440 and to support the display panel 200. The display panel 200 may be seated on the mold frame 300.

The mold frame 300 may be coupled to the bottom chassis 440, and may accommodate the display panel 200. The mold frame 300 may be made of a flexible material, such as plastic, to absorb impact and to protect the display panel 200.

The top chassis 100 may be coupled to the mold frame 300 and the bottom chassis 440 to cover the display panel 200 seated on the mold frame 300. The top chassis 100 may have an open window (which may be positioned in the middle of the top chassis 100) to expose a display area of the display panel 200.

The top chassis 100 may be coupled to the mold frame 300 and the bottom chassis 440 by hooks and/or screws. The top chassis 100 and the bottom chassis 440 may be coupled to each other through various methods and/or mechanisms.

The backlight assembly 400 may include an optical sheet 410, a light guide plate 420, a reflective sheet 430, a bottom chassis 440, a light source unit 450, and a tape 460.

The light source unit 450 may include a light source 451 and a circuit board 452 on which the light source 451 is disposed. The light source unit 450 may be disposed at a corner portion or on a light incident surface of the light guide plate 420. For example, the light source unit 450 may emit light to the edge portion or the light incident surface of the light guide plate 420.

The light source 451 may include at least one LED chip (not shown) and a package (not shown) configured to accommodate the LED chip. The light source 451 may have a light emitting surface in a direction in which the light guide plate 420 is disposed.

The circuit board 452 may be, for example, a printed circuit board (PCB) or a metal core PCB.

The light source unit 450 may be disposed on one side surface, each of two side surfaces, or each of four side surfaces of the light guide plate 420. The light source unit 450 may be disposed on at least one edge portion of the light guide plate 420. One or more light source units 450 may be deployed according to various factors (e.g., a size and/or uniformed brightness requirement of the display panel) associated with the display panel 200.

Light emitted from the light source 451 may be incident toward at least one incident surface of the light guide plate 420. The light guide plate 420 may supply light to the display panel 200 through a surface other than the incident surface. The light guide plate 420 may be disposed close to the light source unit 450 and may be accommodated in the bottom chassis 440. The light guide plate 420 may have for example, a quadrilateral shape and a size corresponding to the display panel 200. In an exemplary embodiment of the present inventive concept, the light guide plate 420 may have various shapes (e.g., predetermined grooves or protrusions) and structures depending on positions of the light sources 451.

The light guide plate 420 may be a plate, a sheet, or a film, and thus, a thin display device may be provided.

The light guide plate 420 may be made of a light-transmissive material such as, for example, an acrylic resin such as polymethylmethacrylate (PMMA) or polycarbonate (PC) to guide light efficiently.

A pattern may be formed on at least one surface of the light guide plate 420. For example, on a lower surface of the light guide plate 420, a scattering pattern (not shown) may be formed to scatter and/or reflect the guided light toward the display panel 200.

The optical sheet 410 may be disposed on an upper portion of the light guide plate 420. The optical sheet 410 may diffuse and/or collimate light transmitted from the light guide plate 420. The optical sheet 410 may include one or more of a diffusion sheet, a prism sheet, a protective sheet, and/or the like. The diffusion sheet may disperse the light incident from the light guide plate 420 to prevent the light from being partly concentrated. The prism sheet may include prisms which have a triangular cross-section and are formed in a predetermined array on one surface of a base film. This prism sheet may be disposed on the diffusion sheet, and may collimate the light diffused through the diffusion sheet in a direction perpendicular to the display panel 200. The protective sheet may be disposed on the prism sheet. The protective sheet may serve to protect a surface of the prism sheet and to diffuse the light to make light distribution uniform.

The reflective sheet 430 may be disposed between the light guide plate 420 and the bottom chassis 440, and thus, light emitted downwards from the light guide plate 420 may be reflected toward the display panel 200. Thus, light efficiency may be increased.

The reflective sheet 430 may be made of, for example, polyethylene terephthalate (PET) which imparts reflective properties. One surface of the reflective sheet 430 may be coated with a diffusion layer containing, for example, titanium dioxide.

In an exemplary embodiment of the present inventive concept, the reflective sheet 430 may be made of a material containing a metal, such as silver (Ag).

The bottom chassis 440 may accommodate the reflective sheet 430 and the light guide plate 420. A bottom surface of the bottom chassis 440 may be disposed parallel to the light guide plate 420. The bottom chassis 440 may be made of a metal material having hardness, such as stainless steel, or a material having good heat dissipation properties, such as aluminum or an aluminum alloy. The bottom chassis 440 may maintain a framework of a display device and protect components accommodated therein.

The tape 460 may fix the light guide plate 420. As the light guide plate 420 is fixed more securely, light emitted from the light source 451 may be more stably supplied to the light guide plate 420.

Hereinafter, a tape structure according to a related art will be described with reference to FIGS. 3 and 4.

Figure 3:
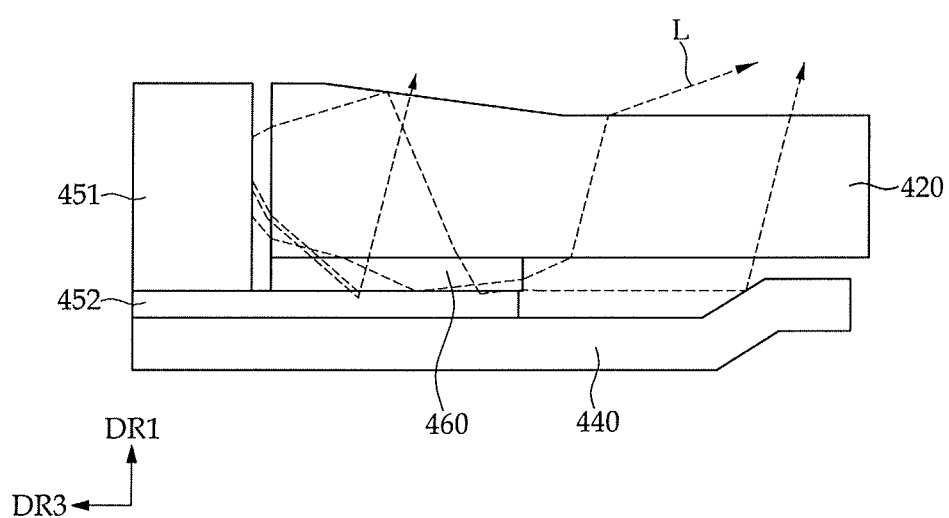
FIG. 3 is a cross-sectional view illustrating light loss resulting from a tape.

FIG. 3 is a cross-sectional view illustrating light loss resulting from a tape. FIG. 4 is a plan view illustrating light loss resulting from a tape.

Figure 4:
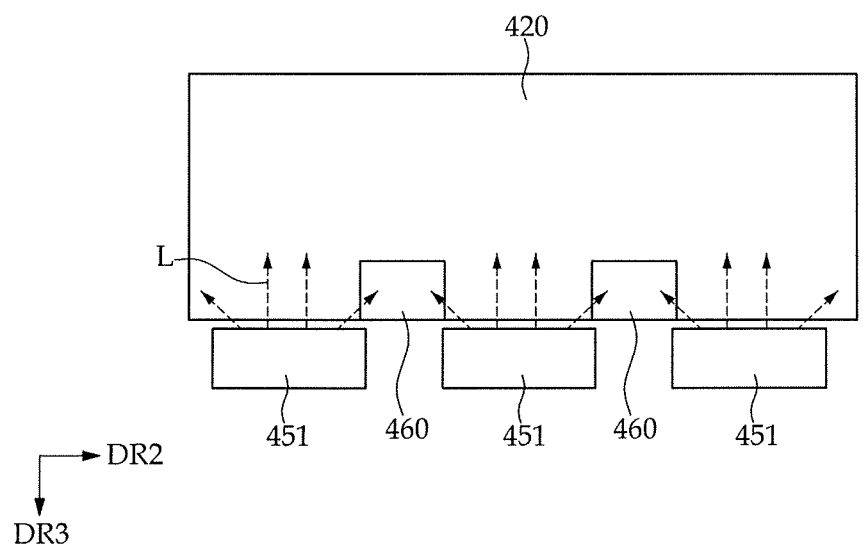
FIG. 4 is a plan view illustrating light loss resulting from a tape.

Referring to FIGS. 3 and 4, the tape 460 may be disposed on a lower surface of the light guide plate 420 to fix the light guide plate 420. In an exemplary embodiment of the present inventive concept, the tape 460 may be disposed between the circuit board 452 and the light guide plate 420.

As illustrated in FIG. 3, according to an related art, a tape 460 may be disposed on a light emitting surface of the light source 451. The tape 460 disposed on the light emitting surface of the light source 451 may scatter some of incident light and reflect the light out of the light guide plate 420. For example, the tape 460 may scatter or reflect light directed toward the light guide plate 420, and thus, a portion of the incident light may be lost.

To reduce the light loss resulting from the tape 460, the tape 460 may be disposed between the light sources 451 as illustrated in FIG. 4. In this case, some of the light emitted from the light source 451 may propagate into the light guide plate 420 and some of the light emitted from the light source 451 might not propagate into the light guide plate 420. For example, a portion of the light emitted from the light source 451 may propagate laterally to be incident on the tape 460.

Hereinafter, a configuration of fixing the light guide plate 420 with a reduced light loss in the backlight assembly structure according to an exemplary embodiment of the present inventive concept, will be described with reference to FIG. 2 and FIGS. 5 to 8.

Figure 5:
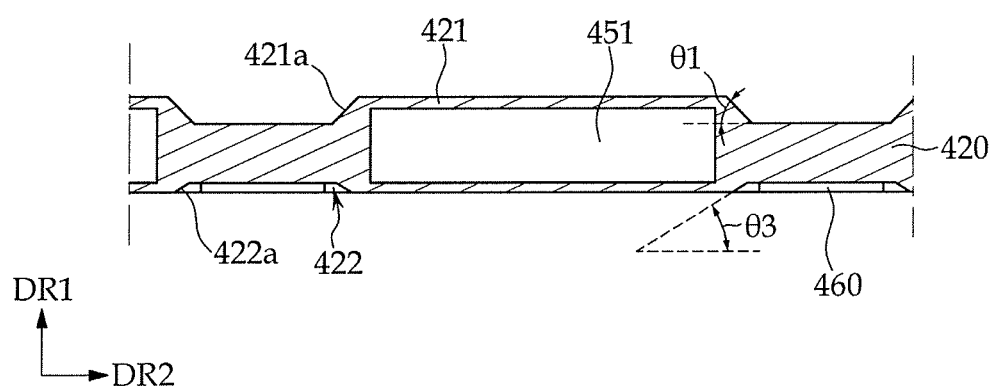
FIG. 5 is a cross-sectional view taken along line B-B' of FIG. 1 illustrating a light collimation unit and a guide groove illustrated in FIG. 1 according to an exemplary embodiment of the present inventive concept.
Figure 6:
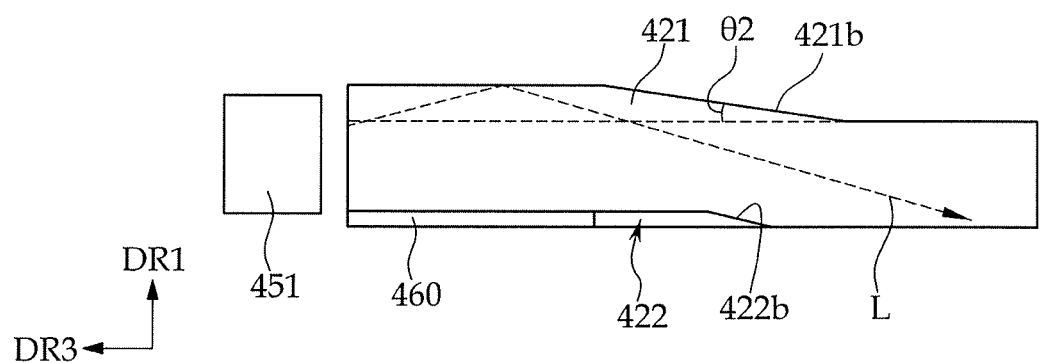
FIG. 6 is a cross-sectional view taken along line A-A' of FIG. 1 illustrating light reflected through a light collimation unit according to an exemplary embodiment of the present inventive concept.
Figure 7:
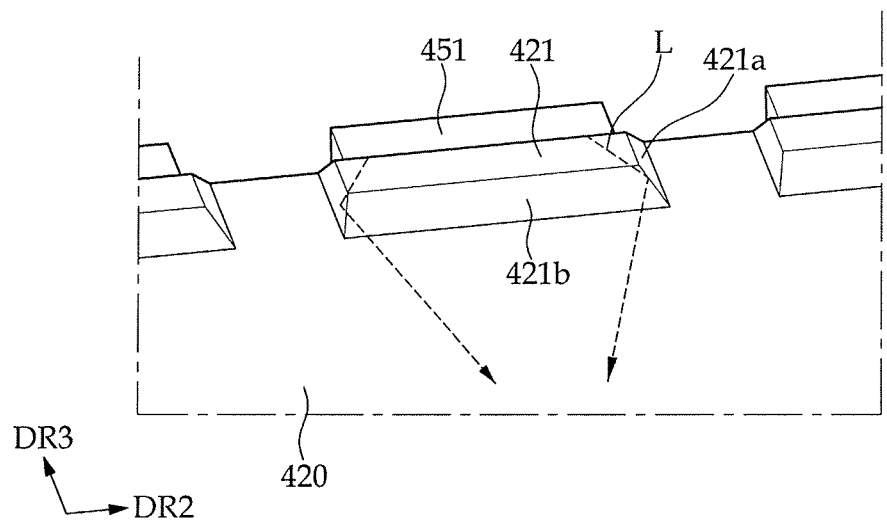
FIG. 7 is a perspective view illustrating light reflected through a light collimation unit according to an exemplary embodiment of the present inventive concept.
Figure 8:
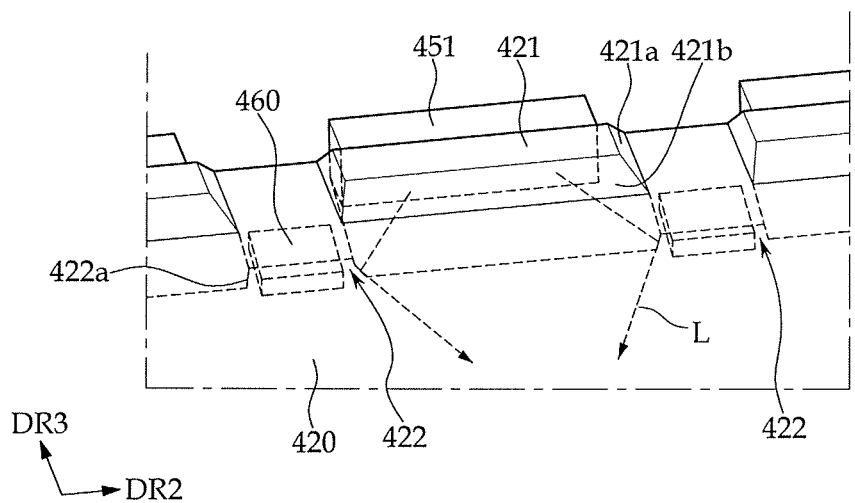
FIG. 8 is a perspective view illustrating light reflected through a guide groove according to an exemplary embodiment of the present inventive concept.

FIG. 5 is a cross-sectional view taken along line B-B' of FIG. 1 illustrating a light collimation unit and a guide groove illustrated in FIG. 1 according to an exemplary embodiment of the present inventive concept. FIG. 6 is a cross-sectional view taken along line A-A' of FIG. 1 illustrating light reflected through a light collimation unit according to an exemplary embodiment of the present inventive concept. FIG. 7 is a perspective view illustrating light reflected through a light collimation unit according to an exemplary embodiment of the present inventive concept. FIG. 8 is a perspective view illustrating light reflected through a guide groove according to an exemplary embodiment of the present inventive concept.

Referring to FIG. 2 and FIGS. 5 to 8, a light collimation unit 421 may be disposed on an upper surface of the light guide plate 420 and a guide groove 422 may be formed in a lower surface of the light guide plate 420.

The light collimation unit 421 may protrude from the upper surface of the light guide plate 420 along a light incident surface of the light guide plate 420. The light incident surface may be a surface on which light is incident. The light collimation unit 421 may be disposed to face the light source 451 as illustrated in FIGS. 2, 5, and 6. The light collimation unit 421 may be disposed higher than the upper surface of the light guide plate 420. For example, the light collimation unit 421 may be disposed on the upper surface of the light guide plate 420 in a protrusive form. Further, the light collimation unit 421 may have a trapezoidal cross-section when the light collimation unit 421 is viewed from the light incident surface of the light guide plate 420.

A region of the light guide plate 420 on which the light collimation unit 421 is disposed may have a larger thickness than a region of the light guide plate 420 in which the guide groove 422 is formed. For example, since the light collimation unit 421 protrudes from the upper surface of the light guide plate 420, a region of the light guide plate 420 where the light collimation unit 421 is disposed may be thicker than other region of the light guide plate 420. The guide groove 422 may be formed by removing a predetermined portion of the light guide plate 420. Therefore, the region where the guide groove 422 is formed may be thinner than other regions where the guide groove 422 is not formed. Thus, the thickness of the light guide plate 420 may vary from region to region because the light collimation unit 421 and the guide groove 422 are formed on the light guide plate 420.

The light collimation unit 421 may increase straightness of light. Light reflected through an upper surface of the light collimation unit 421 may be incident on the light guide plate 420 as illustrated in FIG. 6. Light reflected through a first side inclined part 421a of the light collimation unit 421 may propagate rectilinearly towards the light guide plate 420 as illustrated in FIG. 7. Accordingly, the light collimation unit 421 may be disposed on the upper surface of the light guide plate 420, and thus, the amount of light directed to the tape 460 may be reduced and the amount of light directed to the light guide plate 420 may increase.

The light collimation unit 421 may have a first angle θ1 which is less than a predetermined maximum value. In an exemplary embodiment of the present inventive concept, the first angle θ1 may be in a range of 1° to 30°. The first angle θ1 may refer to an angle between the first side inclined part 421a and a bottom surface of the light collimation unit 421. As previously described, the first side inclined part 421a of the light collimation unit 421 may reflect some of light traveling towards the tape 460 to a region (e.g., the light guide plate 420) where the tape 460 is not disposed. When the first angle θ1 exceeds the predetermined maximum value, light reflected through the first side inclined part 421a may propagate outside the light guide plate 420 because total internal reflection condition is not met. Accordingly, the first side inclined part 421a may have a first angle θ1 which is less than the predetermined maximum value. The first angle θ1 may be in a range of 1° to 30°.

As illustrated in FIG. 6, the light collimation unit 421 may have a front inclined part 421b that becomes gradually lower in height as a distance between the light incident surface of the light guide plate 420 and the front inclined part increases. Thus, the larger amount of light may propagate inside the light guide plate 420 due to light reflection occurring at the front inclined part 421b of the light collimation unit 421. The front inclined part 421b may have a third angle θ2 equal to or smaller than the first angle θ1 of the first side inclined part 421a. The third angle θ2 may refer to an angle between the front inclined part 421b and the bottom surface of the light collimation unit 421. For example, the third angle θ2 of the front inclined part 421b may be equal to or smaller than the first angle θ1 of the first side inclined part 421a, and thus, the straightness of light may be increased.

The guide groove 422 may be formed in a lower surface of the light guide plate 420 along the light incident surface of the light guide plate 420. For example, as illustrated in FIGS. 2, 5, and 6, the guide groove 422 may be formed between the light sources 451. For example, the guide groove 422 may be formed in the lower surface of the light guide plate 420 along the light incident surface and may be formed between the light collimation units 421. For example, the light collimation unit 421 and the guide groove 422 may be disposed alternatively in a direction DR2.

The tape 460 may be disposed on the guide groove 422. As illustrated in FIG. 2, the tape 460 may be disposed between the circuit board 451 and the light guide plate 420.

The tape 460 may be smaller in area than the guide groove 422. In an exemplary embodiment of the present inventive concept, the tape 460 may be disposed on a central portion of the guide groove 422 and an air gap may exist in part of the guide groove 422. The air gap may refract a portion of light traveling toward the tape 460 into the light guide plate 420. As illustrated in, for example, FIGS. 5 and 6, the guide groove 422 may be formed to have substantially the same height as the tape 460. The tape 460 may be disposed in the guide groove 422, and thus, thickness of a display device may be reduced.

The guide groove 422 may increase straightness of light. Second side inclined parts 422a are disposed on the left and right sides of the guide groove 422. Light reflected through the second side inclined part 422a may travel towards the light guide plate 420 as illustrated in FIG. 8. Therefore, the guide groove 422 may be formed in the lower surface of the light guide plate 420, and thus, an amount of light directed towards the tape 460 may be reduced and an amount of light directed towards the light guide plate 420 may increase. Thus, light loss in a backlight assembly may be reduced.

In addition, the second side inclined part 422a may have a second angle θ3 which is less than a predetermined maximum value as illustrated in FIG. 5. In an exemplary embodiment of the present inventive concept, the second angle θ3 may be in a range of 1° to 30°. The second angle θ3 may refer to an angle between the second side inclined part 422a and a bottom surface of the guide groove 422. As previously described, the second side inclined part 422a of the guide groove 422 may reflect some of light directed towards the tape 460 to a region where the tape 460 is not disposed. When the second angle θ3 exceeds the predetermined maximum value (e.g., 30°), light reflected through the second side inclined part 422a may propagate outside the light guide plate 420 because total internal reflection condition is not met. Accordingly, the second side inclined part 422a may have a second angle θ3 which is less than the predetermined maximum value. The second angle θ3 may be in a range of 1° to 30° to meet the total internal reflection condition for the light reflected through the second side inclined part 422a.

As illustrated in FIG. 6, the guide groove 422 may have a front inclined part 422b that becomes gradually lower in height as a distance between the light incident surface of the light guide plate 420 and the front inclined part 422b increases. For example, the guide groove 422 may be formed in an edge portion of the light guide plate 420 and may not extend to a central portion of the light guide plate 420.

The foregoing is illustrative of exemplary embodiments of the present inventive concept and the present inventive concept should not be construed as being limited by the embodiments described herein. Although a few embodiments have been described, it will be understood that various modifications in form and detail may be made without departing from the scope and spirit of the present inventive concept.

What is claimed is:
1. A backlight assembly comprising:
at least one light source;
a light guide plate facing the at least one light source in a first direction, wherein the light guide plate includes a first surface on which light emitted from the at least one light source is incident and a second surface through which the light incident on the first surface is emitted; and
at least one light collimation unit protruding from an upper surface of the light guide plate, the at least one light collimation unit facing the at least one light source, wherein the at least one light collimation unit has a trapezoidal shape when viewed from the first surface of the light guide plate, wherein the at least one light collimation unit comprises a first side inclined part in a second direction substantially perpendicular to the first direction, wherein the first side inclined part forms a first angle with respect to a bottom surface of the at least one light collimation unit, the first angle being less than or equal to a predetermined value, and wherein the predetermined value is 30°; and
at least one guide groove between the light collimation units in a lower surface of the light guide plate along the first surface of the light guide plate.

2. The backlight assembly of claim 1, wherein the at least one light collimation unit is disposed along the first surface of the light guide plate.

3. The backlight assembly of claim 1, further comprising a tape in the at least one guide groove.

4. The backlight assembly of claim 3, wherein an area of the tape is smaller than an area of the at least one guide groove.

5. The backlight assembly of claim 3, wherein a height of the at least one guide groove is substantially the same as a height of the tape.

6. The backlight assembly of claim 3, further comprising a circuit board on which the at least one light source is disposed.

7. The backlight assembly of claim 6, wherein the tape is disposed between the light guide plate and the circuit board.

8. The backlight assembly of claim 1, wherein the at least one guide groove and the at least one light source are alternatingly disposed.

9. The backlight assembly of claim 1, wherein the at least one light collimation unit and the at least one guide groove are alternatingly disposed.

10. The backlight assembly of claim 1, wherein the at least one guide groove comprises a second side inclined part in a second direction substantially perpendicular to the first direction,
wherein the second side inclined part forms a second angle with respect to the lower surface of the light guide plate, the second angle being less than or equal to a predetermined value.

11. The backlight assembly of claim 10, wherein the predetermined value is 30°.

12. The backlight assembly of claim 1, wherein the at least one light collimation unit comprises a front inclined part that becomes gradually lower in height as the front inclined part is farther from the first surface of the light guide plate in the first direction.

13. The backlight assembly of claim 12, wherein the front inclined part of the at least one light collimation unit forms a third angle with respect to the bottom surface of the at least one light collimation unit, and
wherein the third angle is equal to or smaller than the first angle.

14. A display device comprising:
a display panel configured to display an image; and
a backlight assembly configured to supply light to the display panel,
wherein the backlight assembly comprises:
at least one light source;
a light guide plate facing the at least one light source in a first direction, wherein the light guide plate includes a first surface on which light emitted from the at least one light source is incident and a second surface through which the light incident on the first surface is emitted;
at least one light collimation unit protruding from an upper surface of the light guide plate, the at least one light collimation unit facing the at least one light source,
wherein the at least one light collimation unit comprises a first side inclined part in a second direction substantially perpendicular to the first direction,
wherein the first side inclined part forms a first angle with respect to a lower surface of the at least one light collimation unit, the first angle being less than or equal to 30°; and
at least one guide groove formed in a lower surface of the light guide plate along the first surface of the light guide plate, wherein the at least one light collimation unit and the at least one guide groove are alternatingly disposed, and wherein the at least one guide groove does not overlap the at least one light source along a second direction perpendicular to the first direction.

15. The display device of claim 14, wherein a tape is disposed in the at least one guide groove.

16. The display device of claim 14, wherein the at least one guide groove and the at least one light source are alternatingly disposed.

17. The display device of claim 14, wherein the at least one guide groove comprises a second side inclined part in the second direction,
wherein the second side inclined part forms a second angle with respect to the lower surface of the light guide plate, the second angle being less than or equal to 30°.

18. A backlight assembly comprising:
at least one light source;
a light guide plate facing the at least one light source in a first direction, wherein the light guide plate includes a first surface on which light emitted from the at least one light source is incident and a second surface through which the light incident on the first surface is emitted; and
at least one light collimation unit protruding from an upper surface of the light guide plate, the at least one light collimation unit facing the at least one light source, wherein the at least one light collimation unit has a trapezoidal shape when viewed from the first surface of the light guide plate; and
at least one guide groove between the light collimation units in a lower surface of the light guide plate along the first surface of the light guide plate, wherein the at least one guide groove comprises a second side inclined part in a second direction substantially perpendicular to the first direction, wherein the second side inclined part forms a second angle with respect to the lower surface of the light guide plate, the second angle being less than or equal to a predetermined value, wherein the predetermined value is 30°.

* * * * *